Patented Apr. 21, 1953

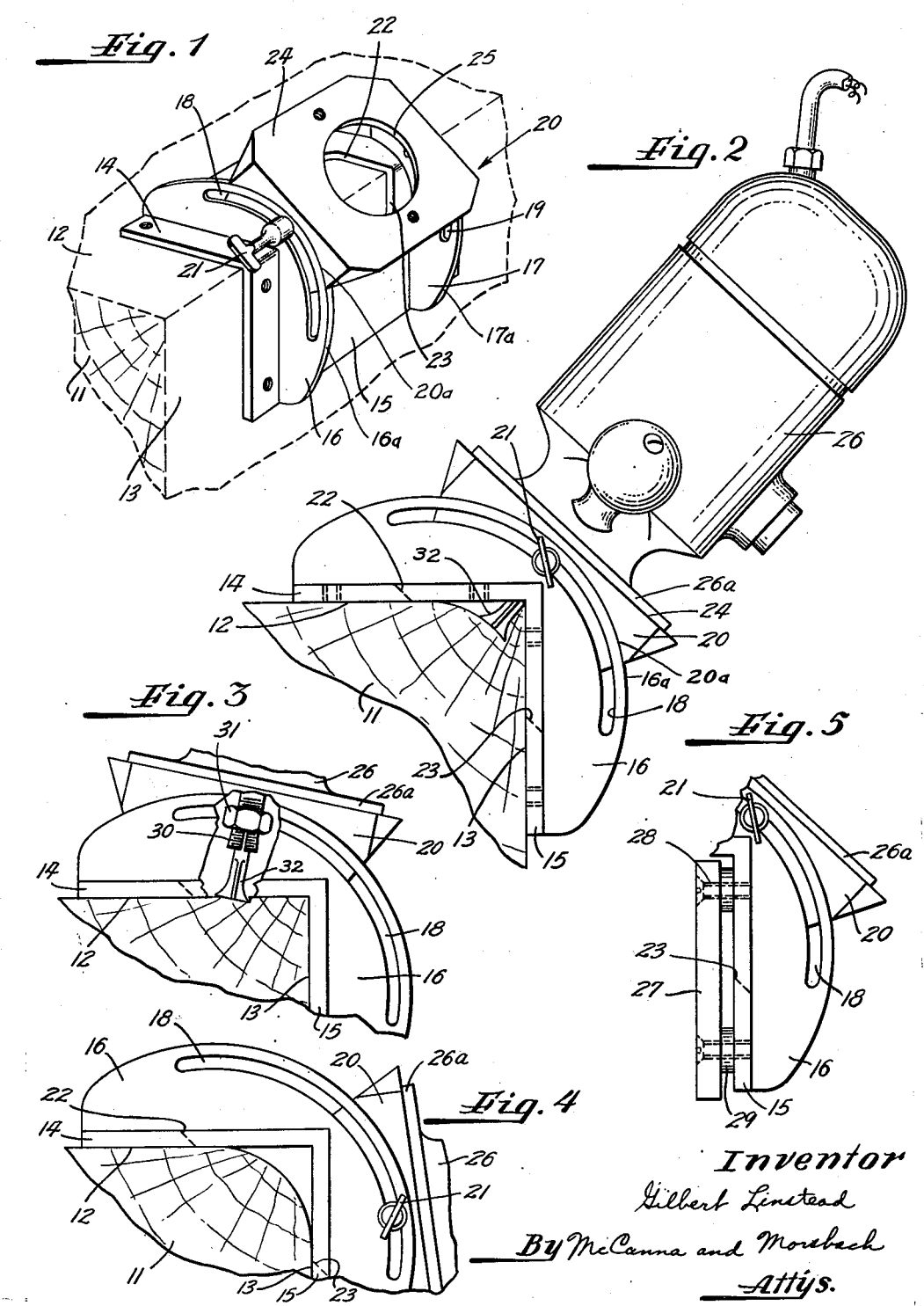

2,635,655

UNITED STATES PATENT OFFICE 2,635,655

ADJUSTABLE MOUNTING ASSEMBLY FOR MOTOR-DRIVEN, HAND-OPERATED SHAPING TOOLS

Gilbert Linstead, Rockford, Ill.

Application February 29, 1952, Serial No. 274,159

8 Claims. (Cl. 144—134)

1

This invention relates to a tool for shaping rounded corners.

It is an object of this invention to provide a novel tool for use in shaping a rounded corner on a work piece.

Another object of this invention is to provide a novel motor-driven tool for shaping a rounded corner on a work piece which has a cutter supported to be guided relative to the work piece and to be angularly adjustable about the corner on the work piece for shaping a rounded corner of the desired configuration.

A further object of this invention is to provide a novel guide for supporting a motor-driven cutter in cutting relation to a work piece which permits the cutter to be adjusted angularly about a corner on the work piece for shaping the corner to the desired rounded configuration.

Other and further objects and advantages of the invention will be apparent from the following description of preferred embodiments thereof, which are illustrated in the accompanying drawing to show the principles and mode of operation of the invention.

In the drawing:

Figure 1 is a perspective view of the guide of the present invention, shown positioned at the corner of the work piece at which it is intended to round the corner by means of a motor-driven cutter;

Figure 2 is an end view of the novel tool of the present invention, including the guide of Fig. 1, with the tool positioned for rounding the corner on the work piece;

Figure 3 is a fragmentary end view of the Fig. 2 tool, partly broken away to show the cutter in position for the initial cut for rounding the corner on the work piece;

Figure 4 is a fragmentary end view of the Fig. 2 tool positioned at the end of the cutting of the rounded corner on the work piece; and Figure 5 is a fragmentary end view of a modified form of the guide for the cutter which is provided with means for changing the curvature of the rounded corner on the work piece.

Referring to the drawing, the work piece 11, which may be intended, when finished, to be used as a mold pattern, has rectangularly disposed, intersecting, flat faces 12 and 13 at whose intersection it is desired to form a rounded corner. To this end there is provided a guide according to the present invention, which includes rigid flat plates 14 and 15, which are disposed at right angles to one another and which are shaped and disposed respectively to overlie the surfaces 12 and 13 of the work piece. The plates 14 and 15 are suitably rigidly interconnected and support a pair of spaced, upstanding arcuate guide arms 16 and 17. These guide arms are formed respectively with arcuate slots 18 and 19 of the desired curvature for guiding the motor-driven cutter in the cutting of the rounded corner on the work piece 11.

A hollow support bracket 20 is adjustably mounted on the arcuate guide arms 16 and 17 by means of threadedly adjustable clamping bolts 21 which extend through the guide slots 18 and 19 in the guide arms 16 and 17. For adjusting the angular position of the support bracket 20 about the plates 14 and 15, the guide bolts 21 are loosened and the bracket 20 moved along the guide arms 16 and 17 to the proper location, after which the bolts 21 are tightened to maintain bracket 20 rigidly in the position to which it has been adjusted. Bracket 20 is formed with end walls which extend inwardly toward the plates 14 and 15. These end walls are formed with transverse offset arcuate faces 20a shaped to overlie the outer arcuate faces 16a and 17a of the guide arms 16 and 17 to assist in guiding the bracket 20 along the guide arms 16 and 17 when it is angularly adjusted thereon.

As best seen in Fig. 1, the plates 14 and 15 are formed with cut-away portions 22 and 23 which communicate with one another at the corner juncture of these plates. These cut-away portions expose the underlying surfaces of the work piece 11 at the corner for engagement by the motor-driven cutter 32. The outer flat face 24 of the support bracket 20 is formed with an aperture 25 for passing the chuck which carries the cutter. This aperture is in alignment with the cut-away portions 22 and 23 of the plates 14 and 15.

The tool of the present invention also includes an electric driving motor for the cutter, this motor being contained in a housing 26 which has its bottom flange 26a separably bolted to the outer face 24 of the support bracket. A chuck 30 (Fig. 3) which is driven from the motor shaft, extends inwardly through the aperture 25 toward the work piece 11 and carries the cutter 32 for driving the same. Referring to Fig. 3, the chuck 30 may be in the form of an externally threaded, longitudinally bifurcated, socketed member which receives the shank of the cutter 32 in its socket. A clamping nut 31 is threaded onto the chuck 30 for clamping the furcations thereof together to secure the cutter 32 in place on the chuck. Obviously other chucks for the cutter may be provided, as desired, and the present invention is in no way limited to the particular chuck shown.

In the operation of the mechanism described above, initially the support bracket 20 is adjusted to be rigidly supported at an angular position as shown in Fig. 3. In this position of the support bracket, the end of the cutter 32 is located to just engage the surface 12 for making the initial cut in the work piece. The complete tool consisting of the plates 14, 15, guide arms 16, 17, support bracket 20, and motor-driven cutter 32 is moved lengthwise back and forth along the block parallel to the corner thereof to form the initial cut in the top surface 12 of the work piece in spaced relation to the corner of the work piece.

Then, the clamping bolts 21 are loosened and the angular position of the support bracket 20 is adjusted (clockwise in the drawing) to the next desired angular location along the slots 18 and 19 and the clamping bolts are again tightened to secure the support bracket 20 in this position. The complete tool consisting of plates 14, 15 guide arms 16, 17, support bracket 20, and motor-driven cutter 32 is again slid back and forth along the work piece 11 to form the next cut in the work piece, which is located closer to the corner of the work piece and which is a deeper cut due to the arcuate extent of the guide slots 18 and 19 (see Fig. 2).

The preceding steps are repeated at successive angular locations of the support bracket 20 about the guide arms 16 and 17 until the arcuate cut has been substantially completed.

For finishing the cut, to smooth off any sharp corners which might have been formed between successive lengthwise cuts, the clamping bolts 21 are loosened and the support bracket 20 is moved back and forth along the guide slots 18 and 19 while the complete tool consisting of plates 14, 15, guide arms 16, 17, support bracket 20 and motor-driven cutter 32 is shifted slowly back and forth lengthwise along the work piece.

Obviously, with the foregoing mechanism the shape of the rounded corner formed in the work piece is determined by the shape of the arcuate guide slots 18 and 19 in the guide arms 16 and 17. The depth of the cut in the work piece (i. e., the arc of curvature of the rounded corner) depends upon the spacing of the guide slots 18 and 19 from the work piece.

For changing the arc of curvature of the rounded corner, auxiliary plates 27 (Fig. 5) may be releasably attached by screws 28 to the inner faces of the plates 14 and 15, suitable spacers 29 being provided to space the auxiliary plates 27 from the inner faces of the plates 14 and 15, if desired. By providing these auxiliary plates and spacers the arc of the rounded corner is reduced.

While in the foregoing description there are disclosed specific preferred embodiments of the present invention, it is to be understood that various modifications, omissions and refinements may be adopted which depart from the described forms of the invention without departing from the spirit and scope of my invention.

I claim:

1. A tool for shaping a rounded corner on a work piece, comprising a guide for guiding a motor-driven cutter during the shaping of a rounded corner at intersecting surfaces on the work piece, said guide including a pair of interconnected plates having under faces shaped respectively to engage the intersecting surfaces on the work piece adjacent the corner formed at the intersection of said surfaces, a guide arm rigidly attached to said plates at the outer faces thereof remote from said under faces and extending outward from said outer faces in a direction away from the under faces of the plates, and a support bracket for the motor-driven cutter mounted on said guide arm to be adjustable thereon angularly about the corner on the work piece, and a motor-driven cutter including a motor housing attached to said support bracket, a driving motor in said motor housing, and a cutter driven by said motor and positioned to engage the work piece adjacent the corner thereon.

2. A tool for shaping a rounded corner on a work piece, comprising a guide for guiding a motor-driven cutter during the shaping of a rounded corner at intersecting surfaces on the work piece, said guide including a pair of rigid plates interconnected with one another and having under faces disposed angularly with respect to one another and shaped respectively to engage the intersecting surfaces on the work piece adjacent the corner on the work piece formed at the intersection of said surfaces, said plates being apertured to expose the underlying surfaces of the work piece at the corner, a guide arm rigidly attached to said plates to extend transversely outward therefrom away from the work piece, and a support bracket for the motor-driven cutter mounted on said guide member to be angularly adjustable thereabout, said support bracket being formed with an aperture aligned with the apertures in said plates and communicating therewith for passing the cutter, and a motor-driven cutter including a motor housing attached to said support bracket to extend around said aperture therein, a driving motor in said motor housing, a chuck driven by said motor and extending through said aperture in the support bracket, and a cutter connected to said chuck and extending through said apertures in the plates and supported to have its end positioned to engage the work piece.

3. A tool for shaping a rounded corner on a work piece, comprising a guide for guiding a motor-driven cutter during the shaping of a rounded corner at intersecting surfaces on the work piece, said guide including a pair of angularly disposed rigid plates rigidly interconnected with one another and having flat faces disposed angularly with respect to one another for engagement with angularly disposed flat surfaces on the work piece adjacent the intersection of said surfaces, said plates being formed with apertures which communicate with one another at the interconnection of the plates for exposing the underlying surfaces of the work piece, a pair of guide arms rigidly mounted on said plates to extend transversely outward therefrom away from the work piece, and a support bracket for the motor-driven cutter mounted on said guide arms to be angularly adjustable thereabout, said support bracket being formed with an aperture aligned with the apertures in said plates and communicating therewith for passing the cutter, and a motor-driven cutter including a motor housing attached to said support bracket to extend around said aperture therein, a driving motor in said motor housing, a chuck driven by said motor and extending through said aperture in the support bracket, and a cutter connected to said chuck and extending through said communicating apertures in the plates and supported to have its end remote from the chuck positioned to engage the underlying work piece.

4. A tool for shaping a rounded corner on a work piece, comprising a guide for guiding a motor-driven cutter during the shaping of a rounded corner at intersecting, angularly disposed, flat surfaces on the work piece, said guide including a pair of angularly disposed rigid plates rigidly interconnected with one another and having flat under faces disposed angularly with respect to one another for engagement with angularly disposed flat surfaces on the work piece adjacent the intersection of said surfaces, said plates being formed with apertures which communicate with one another at the interconnection of said plates for exposing the underlying surfaces of the work piece, a pair of guide arms rigidly attached to said plates at the faces thereof remote from said under faces and extending outward therefrom in a direction away from said under faces on the plates, said guide arms being formed with arcuate slots extending around the interconnection of said plates in spaced relation therefrom, and a support bracket for the motor-driven cutter mounted on said guide arms to be adjustable along said slots, said support bracket being formed with an aperture aligned with the apertures in said plates and communicating therewith for passing the cutter, and a motor-driven cutter including a motor housing attached to said support bracket to extend around said aperture therein, a driving motor in said motor housing, a chuck driven by said motor and extending through said aperture in the support bracket, and a cutter connected to said chuck and extending through said communicating apertures in the plates and supported to have its outer end positioned to engage the underlying work piece.

5. A tool for shaping a rounded corner on a work piece, comprising a guide for guiding a motor-driven cutter during the shaping of a rounded corner at the intersection of rectangularly disposed flat surfaces on a work piece, said guide including a pair of rigid plates rigidly interconnected and formed with intersecting flat under faces which extend at right angles to one another and which are shaped to engage intersecting rectangularly disposed flat surfaces on a work piece adjacent the intersection of said surfaces, said plates being formed with apertures which communicate with one another at their intersection for passing the cutter, a pair of spaced guide arms rigidly connected to the outer faces of said plates remote from said under faces thereof and extending transversely outward from said outer faces in a direction away from said under faces on the plates, said guide arms being formed with identical arcuate slots extending around the interconnection of said plates in spaced relation therefrom, and a support bracket adjustably mounted on said guide arms, said support bracket having clamping bolts received in said arcuate slots in the guide arms for the selective adjustment of the support bracket to the desired position along said slots, said support bracket being formed with an outer face for releasable attachment to the motor housing of a motor-driven cutter, and said support bracket at said outer face being formed with an aperture aligned with said apertures in the plates for passing the cutter, and a motor-driven cutter including a motor housing attached to the outer face of said support bracket to extend around said aperture therein, a driving motor in said motor housing, a chuck driven by said motor and extending through said aperture in the support bracket, and a cutter attached to said chuck and extending through said communicating apertures in the plates and supported to have its outer end positioned to engage the work piece.

6. A guide for a motor-driven cutter for guiding the cutter during the shaping of a rounded corner on a work piece at the intersection of angularly disposed surfaces on the work piece, comprising a pair of rigid plates interconnected with one another and having under faces disposed angularly with respect to one another and shaped respectively to engage angularly disposed surfaces on the work piece adjacent the intersection of said surfaces, said plates being formed with communicating apertures at the interconnection of said plates for exposing the underlying surfaces of the work piece, a guide arm rigidly attached to said plates to extend transversely outward therefrom away from the work piece, and a support bracket mounted on said guide arm to be angularly adjustable thereabout and having an outer face remote the work piece for attachment to the motor housing of a motor-driven cutter, said support bracket being apertured in line with said apertures in said plates for passing the cutter.

7. For guiding a motor-driven cutter during the shaping of a rounded corner on a work piece at the intersection of angularly disposed flat surfaces on the work piece, a guide comprising a pair of angularly disposed rigid plates rigidly interconnected with one another and having flat under faces disposed angularly with respect to one another for engagement with angularly disposed flat surfaces on the work piece adjacent the intersection of said surfaces, said plates being formed with apertures which communicate with one another at the interconnection of said plates for exposing the underlying surfaces of the work piece, a pair of guide arms rigidly attached to the outer faces of said plates remote from said under faces thereof and extending transversely outward therefrom in a direction away from the work piece, said guide arms being formed with arcuate slots extending around the interconnection of said plates in spaced relation therefrom, and a support bracket for the motor-driven cutter mounted on said guide arms to be adjustable along said slots, said support bracket being formed with an aperture aligned with the apertures in said plates and communicating therewith for passing the cutter.

8. For use with a motor-driven cutter for shaping a rounded corner at the intersection of rectangularly disposed flat surfaces on a work piece, a guide for guiding the motor-driven cutter comprising a pair of rigid plates rigidly interconnected and formed with intersecting flat under faces which extend at right angles to one another and which are shaped to engage intersecting rectangularly disposed flat surfaces on a work piece adjacent the intersection of said surfaces, said plates being formed with apertures which communicate with one another at their intersection for passing the cutter, a pair of spaced guide arms rigidly attached to the outer faces of said plates remote from said under faces thereof and extending transversely outward therefrom in a direction away from said under faces on the plates, said guide arms being formed with identical arcuate slots extending around the interconnection of said plates in spaced relation therefrom, and a support bracket adjustably mounted on said guide arms, said support bracket having clamping bolts received in said arcuate slots in the guide arms for the selective adjustment of the support bracket to the desired position along said slots, said support bracket being formed with an outer face for releasable attachment to the motor housing of a motor-driven cutter, and said support bracket at said outer face being formed with an aperture aligned with said apertures in the plates for passing the cutter.

GILBERT LINSTEAD.

References Cited in the file of this patent

UNITED STATES PATENTS

| Number | Name | Date |
| --- | --- | --- |
| 1,116,158 | Swain et al. | Nov. 3, 1914 |
| 1,566,824 | Carter | Dec. 22, 1925 |
| 1,736,965 | Carter | Nov. 26, 1929 |
| 1,752,940 | Cilley | Apr. 1, 1930 |

FOREIGN PATENTS

| Number | Country | Date |
| --- | --- | --- |
| 11,300 | Great Britain | 1912 |